United States Patent
Kumar et al.

(10) Patent No.: US 7,349,583 B2
(45) Date of Patent: Mar. 25, 2008

(54) GLOBAL MOTION ESTIMATION IMAGE CODING AND PROCESSING

(75) Inventors: Sanjeev Kumar, La Jolla, CA (US); Truong Nguyen, San Diego, CA (US); Mainak Biswas, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 352 days.

(21) Appl. No.: 10/931,473

(22) Filed: Sep. 1, 2004

(65) Prior Publication Data
US 2005/0094852 A1 May 5, 2005

Related U.S. Application Data

(60) Provisional application No. 60/500,497, filed on Sep. 5, 2003.

(51) Int. Cl.
*G06K 9/32* (2006.01)
(52) U.S. Cl. .................. 382/294; 345/648; 345/649; 348/583; 348/699; 382/107
(58) Field of Classification Search ........... 382/294
See application file for complete search history.

(56) References Cited

U.S. PATENT DOCUMENTS

| | | | | |
|---|---|---|---|---|
| 4,590,607 A | * | 5/1986 | Kauth | 382/294 |
| 5,432,543 A | * | 7/1995 | Hasegawa et al. | 348/45 |
| 5,495,540 A | * | 2/1996 | Frankot et al. | 382/294 |
| 5,557,684 A | * | 9/1996 | Wang et al. | 382/107 |
| 5,592,228 A | * | 1/1997 | Dachiku et al. | 348/416.1 |
| 5,668,608 A | * | 9/1997 | Lee | 348/699 |
| 5,717,463 A | * | 2/1998 | Brailean et al. | 375/240.12 |
| 5,774,591 A | * | 6/1998 | Black et al. | 382/236 |
| 5,777,690 A | * | 7/1998 | Takeda et al. | 348/699 |
| 5,850,486 A | * | 12/1998 | Maas et al. | 382/294 |
| 5,901,252 A | * | 5/1999 | Kawakami et al. | 382/276 |
| 5,951,475 A | * | 9/1999 | Gueziec et al. | 600/425 |

(Continued)

OTHER PUBLICATIONS

Reddy, B.S., Chatterji, B.N. , "An FFT-based technique for translation, rotation, andscale-invariant image registration", Image Processing, IEEE Transactions on, vol. 5, Issue: 8, 1996, ISSN: 1057-7149.*

(Continued)

*Primary Examiner*—Matthew C. Bella
*Assistant Examiner*—Sath V. Perungavoor
(74) *Attorney, Agent, or Firm*—Greer, Burns & Crain, Ltd.

(57) ABSTRACT

The invention provides methods for global motion estimation, determining a coarse estimation, and refining a coarse estimation. Embodiments of the invention provide a fast and robust global motion estimation algorithm based on two-stage coarse-to-fine refinement strategy, which is capable of measuring large motions. An embodiment of the invention may be applied as a modification of any standard, e.g. MPEG-4 that uses the affine model of motion estimation. Embodiments of the invention may be used in the six parameter affine motion model, and other embodiments of the invention are applicable to the two parameter translation model, the four parameter RST model, and the eight parameter projective model. In a preferred embodiment, a coarse estimation is developed in a translation invariant domain, and then is refined in the spatial domain.

13 Claims, 7 Drawing Sheets

U.S. PATENT DOCUMENTS

| | | | | |
|---|---|---|---|---|
| 5,956,435 | A | * | 9/1999 | Buzug et al. ............... 382/283 |
| 6,014,473 | A | * | 1/2000 | Hossack et al. ............ 382/294 |
| 6,069,668 | A | * | 5/2000 | Woodham et al. .......... 348/578 |
| 6,173,087 | B1 | * | 1/2001 | Kumar et al. ............... 382/284 |
| 6,178,271 | B1 | * | 1/2001 | Maas, III .................... 382/294 |
| 6,266,452 | B1 | * | 7/2001 | McGuire .................... 382/294 |
| 6,266,453 | B1 | * | 7/2001 | Hibbard et al. ............. 382/294 |
| 6,314,197 | B1 | * | 11/2001 | Jain et al. ................... 382/125 |
| 6,577,744 | B1 | * | 6/2003 | Braudaway et al. ........ 382/100 |
| 6,628,845 | B1 | * | 9/2003 | Stone et al. ................ 382/294 |
| 6,741,757 | B1 | * | 5/2004 | Torr et al. .................. 382/294 |
| 6,922,493 | B2 | * | 7/2005 | Stanek ....................... 382/293 |
| 6,975,745 | B2 | * | 12/2005 | Bradley ...................... 382/100 |
| 7,044,602 | B2 | * | 5/2006 | Chernyak ................... 351/208 |
| 7,095,876 | B2 | * | 8/2006 | Broekaert ................... 382/107 |
| 7,126,616 | B2 | * | 10/2006 | Jasa et al. ................... 345/645 |
| 7,187,810 | B2 | * | 3/2007 | Clune et al. ................ 382/294 |

OTHER PUBLICATIONS

Hoi-Kok Cheung, Wan-Chi Siu,"Fast global motion estimation for sprite generation", Circuits and Systems, 2002. ISCAS 2002. IEEE International Symposium on,, May 2002.*

Kim, Taejung, Im, Yong-Jo, "Automatic Satellite Image Registration by Combination of Stereo Matching and Random Sample Consensus", http://www.gisdevelopment.net/aars/acrs/2002/adp/106.pdf, Nov. 25-29, 2002, Kathmandu, Nepal.*

C. Stiller and J. Konrad, "Estimating Motion In Image Sequences", *IEEE Signal Processing Magazine*, vol. 16, No. 4, pp. 70-91, Jul. 1999.

B.K.P. Horn and B. G. Schunck, "Determining Optical Flow", *Artificial Intelligence*, vol. 17, Nos. 1-3, pp. 185-203, Aug. 1981.

R. Szeliski and J. Coughlan, "Hierarchical Spline-Based Image Registration", In *Proceedings CVPR-1994(IEEE Computer Society conference on Computer Vision and Pattern Recognition)*, vol. 1, pp. 194-201, Jun. 1994.

F. Dufaux and J. Konrad, Efficient, Robust And Fast Global Motion Estimation For Video Coding, *IEEE Transactions on Image Processing*, vol. 9, No. 3, pp. 497-501, Mar. 2000.

A. Averbuch and Y. Keller, "Fast Motion Estimation Using Bidirectional Gradient Methods", In *Proceedings ICASSP-2002 (IEEE International Conference on Acoustics, Speech and Signal Processing)*, vol. 4, pp. 3616-3619, May 2002.

C. L. Huang and P. Y. Chang, "A Multi-Resolution Image Registration Method For Multimedia Application", In *Proceedings ISCAS-1998 (IEEE International Symposium on Circuits and Systems)*, vol. 3, pp. 13-16, May 1998.

P. Thevenaz, U.E. Ruttimann, and M. Unser, "A Pyramid Approach To Subpixel Registration Based On Intensity", *IEEE Transactions on Image Processing*, vol. 7, No. 1, pp. 27-41, Jan. 1998.

Y. Keller and A. Averbuch, "Fast Gradient Methods Based On Global Motion Estimation For Video Compression", *IEEE Transactions on Circuits and Systems for Video Technology*, vol. 13, No. 4, pp. 300-309, Apr. 2003.

Wing Cheong Chan, O. C. Au, and Fai Fu Ming, "A Novel Predictive Global Motion Estimation For Video Coding", In *Proceedings ISCASS-2002(IEEE International Symposium on Circuits and Systems)*, vol. 3, pp. 5-8, May 2002.

G. Wolberg and S. Zokai, "Robust Image Registration Using Log-Polar Transform", In *Proceedings ICIP-2000(IEEE International Conference on Image Processing)*, vol. 1, pp. 493-496, Sep. 2000.

H. Richter, A. Smolic, B. Stabernack, and E. Muller, "Real Time Global Motion Estimation For An MPEG-4 Video Encoder", In *Proceedings PCS-2001 (Picture Coding Symposium)*, vol. 1, pp. 401-404, Apr. 2001.

T. Vlachos, Simple Method For Estimation Of Global Motion Parameters Using Sparse Translational Motion Vector Fields, *Electronics Letters*, vol. 34, No. 1, pp. 60-62, Jan. 8, 1998.

Yeping Su, Ming Ting Sun, and V Hsu, "Global Motion Estimation From Coarsely Sampled Motion Vector Field And The Applications", In *Proceedings ISCAS-2003 (IEEE International Symposium on Circuits and Systems)*, vol. 2, pp. 628-631, May 2003.

C. Kuglin and D. Hines, "The Phase Correlation Image Alignment Method", In *Proceedings ICCS-1975 (IEEE International Conference on Cybernetics and Society)*, pp. 163-165, 1975.

G. Thomas, "Television Motion Measurement For DATV And Other Applications", Research Department Report 11, BBC Research Department, 1987.

H. Shekarforoush, M. Berthod, and J. Zerubia, "Subpixel Image Registration By Estimating The Polyphase Decomposition Of The Cross Power Spectrum", In *Proceedings CVPR-1996 (IEEE Computer Society Conference on Computer Vision and Pattern Recognition)*, pp. 532-537, Jun. 1996.

D. Casasent and D. Psaltis, "Position, Rotation, And Scale Invariant Optical Correlation", *Applied Optics*, vol. 15, No. 7, pp. 1795-1799, Jul. 1976.

B. S. Reddy and B. N. Chatterji, "An FFT-Based Technique For Translation, Rotation, And Scale-Invariant Image Registration", *IEEE Transactions on Image Processing*, vol. 5, No. 8, pp. 1266-1271, Aug. 1996.

L. Hill and T. Vlachos, "On The Estimation Of Global Motion Using Phase Correlation For Broadcast Applications", In *Proceedings IPA-1999 (IEE International Conference on Image Processing and Its Applications)*, vol. 2, pp. 721-725, Jul. 1999.

R. N. Bracewell, K. Y. Chang, A. K. Jha, and Y. H. Wang, Affine Theorem For Two-Dimensional Fourier Transform, *Electronics Letters*, vol. 29, No. 3, p. 304, Feb. 1993.

L. Lucchese, "Estimating Affine Transformations In The Frequency Domain", In *Proceedings ICIP-2001 (IEEE International Conference on Image Processing)*, vol. 2, pp. 7-10, Oct. 2001.

S. Kruger and A. Calway, "A Multiresolution Frequency Domain Method For Estimating Affine Motion Parameters", In *Proceedings ICIP-1996 (IEEE International Conference on Image Processing)*, vol. 1, pp. 113-116, Sep. 1996.

Morgan McGuire, "An Image Registration Technique For Recovering Rotation, Scale And Translation Parameters", Technical Report TR 98-018, NEC Research Institute, Princeton N.J., Feb. 1998.

M. A. Fischler and R.C. Bolles, "Random Sample Consensus: A Paradigm For Model Fitting With Applications To Image Analysis And Automated Cartography", *Communications of the ACM*, vol. 24, No. 6, pp. 381-395, 1981.

R. I. Hartley, "In Defense Of The Eight-Point Algorithm", *IEEE Transactions on Pattern Analysis and Machine Intelligence*, vol. 19, No. 6, pp. 580-593, Jun. 1997.

H.K. Cheung and W.C. Siu, "Fast Global Motion Estimation For Sprite Generation", IEEE International Symposium on Circuits and Systems, pp. III-1-III-4, vol. 3, 2002.

A. Smolic, T. Sikora and J.R. Ohm, "Long-Term Global Motion Estimation and its Applications for Sprite Coding, Content Description, and Segmentation", IEEE Transactions on Circuits and Systems for Video Technology, vol. 9, No. 8, Dec. 1999.

\* cited by examiner

GLOBAL MOTION ESTIMATION IMAGE CODING AND PROCESSING

REFERENCE TO RELATED APPLICATION AND PRIORITY CLAIM

This application claims priority under 35 U.S.C. 119 from provisional application Ser. No. 60/500,497, filed Sep. 5, 2003.

FIELD OF THE INVENTION

A field of the invention is image and video coding. Other fields of the invention include image and video processing, digital communications and digital storage of image and video.

BACKGROUND OF THE INVENTION

Digital communication and storage of image data is a difficult task due to the sheer volume of digital data required to accurately describe a video sequence. In video, the amount of data quickly becomes very large. Global motion estimation may be used in combination with a block-based motion estimation algorithm to describe image and video data. It may also be used to achieve effects, such as zoom and pan effects. With motion estimation, the amount of data needed to describe, for example, a video sequence may be greatly reduced, as are the demands on storage media and channels, whether internal hardware channels or communication media.

In general, global motion describes the coherent component of motions of different constituent parts of an image or a portion of an image, by a parameterized motion model. The process of estimating these parameters is known as Global Motion Estimation. A global motion may arise due to actual changing of image components, and also arises due to the apparent motion of image background, which can be induced by a camera change, such as pan, zoom, or a camera view from a different point of origin (e.g., a second camera angle viewing the same image). All of these and other changes can induce global motion.

Global motion estimation may therefore be used (by itself or in combination with a block-based motion estimation algorithm) to accomplish video compression, segmentation, mosaicing, format conversion, image registration, camera stabilization and other similar image handling tasks and image manipulation effects. In the art, global motion estimation methods can be broadly classified into two categories by the operational domains. A first class are those that operate in the spatial domain. A second class are those that operate in the frequency domain.

Most common spatial domain methods include those based on minimization of SSD (sum of squared difference) or SAD (sum of absolute difference) error metric. SSD minimization is typically accomplished by gradient descent methods like ML (Marquardt-Levenburg). Such techniques are iterative. Each iteration involves image warping and re-computation of derivatives. Accordingly, the techniques are inherently computationally intensive and slow.

Several speed-up strategies have been proposed. One strategy is the use of a multi-resolution framework. See, e.g. R. Szeliski and J. Coughlan, "Hierarchical Spline-Based Image Registration," Proceedings CVPR-1994 (IEEE Computer Society conference on Computer Vision and Pattern Recognition), Vol. 1, pp. 194-201 (June 1994). Another strategy is a modification of the Marquardt-Levenburg (ML) method. See, e.g., A. Averbuch and Y. Keller, "Fast Motion Estimation Using Bi-Directional Gradient Methods," Proceedings ICASSP-2002 (IEEE International Conference on Acoustics, Speech and Signal Processing), Vol. 4, pp. 3616-3619, (May 2002). Selective integration and warp free formulation have also been proposed. See, e.g., Y. Keller and A. Averbuch, "Fast Gradient Methods Based on Global Motion Estimation for Video Compression," *IEEE Transactions on Circuits and Systems for Video Technology,* 13(4):300-309 (April 2003).

The SAD error metric is easier to compute compared to SSD, and its minimization is typically accomplished by a direct search of parameter space. However, the complexity of search increases exponentially with number of parameters. SSD and SAD minimization based techniques suffer from the disadvantage that they might get stuck in local minima, although it is less likely in multi resolution framework.

To deal with large motion, log-polar domain coarse estimation followed by refinement using ML optimization has also been proposed (See, G. Wolberg and S. Zokai, "Robust Image Registration Using Log-Polar Transform," Proceedings ICIP-2000 (IEEE International Conference on Image Processing), Vol. 1, pp. 493-496 (September 2000)) but due to log-polar mapping in spatial domain, this method is not suitable when there is a foreground object at the center of coordinate system.

Feature based methods rely on extraction and tracking of feature points. A motion parameter is obtained by robust least square fitting to the coordinates of feature points. Extracting reliable features and discarding unreliable ones such as those belonging to foreground and occlusion junctions, and handling of newly appearing and disappearing features are very difficult problems, however. A closely related class of methods uses motion vectors of blocks instead of the coordinates of feature points, which is very suitable for MPEG-2 to MPEG-4 transcoding since motion vectors are already computed. The range and accuracy of these methods is limited by range and accuracy of motion vectors. Additionally, if a motion vector is not available, the computational cost of finding them for a reasonable range of motion vectors and sub-pixel accuracy can be prohibitive.

Among frequency domain techniques, phase correlation is a very popular and efficient technique for motion estimation. In its original form, it can only handle integer-pixel translations. By adopting interpolation of the correlation surface and polyphase decomposition of the cross power spectrum, it has been extended to sub-pixel translations. Re-sampling the Fourier magnitude spectra on a log-polar grid has been introduced to also estimate scaling and rotation using phase-correlation, and it has been used in image registration and global motion estimation.

Estimation of the affine parameters in the frequency domain is based upon the Affine Theorem of Fourier Transform. See, R. N. Bracewell et al., "Affine Theorem for Two-Dimensional Fourier Transform," Electronics Letters, 29(3):304 (February 1993). In this approach, the Fourier shift property is exploited to achieve translation invariance by taking the magnitude of the Fourier spectra of images. By working in this translation invariant domain, known as the Fourier-Mellin domain, a linear matrix component (A) of affine transformation can be determined independent of a translational vector component (B). Once the linear component has been determined, it can be compensated for and translation can be determined using Phase-correlation.

Parametric models that have been used to achieve global motion estimation include the 2-parameter translation model, 4-parameter rotation-scale-translation (RST) model, 6-parameter affine model, and the 8-parameter projective model. The affine motion model is widely used because it provides an acceptable tradeoff between generality and ease of estimation. The primary difficulties in applying the affine motion model include the possibility of large motions, differently moving foreground objects, and appearing and disappearing image regions. Accounting for these problems tends to make application of the affine model complex, while the failure to account for these problems can lead to poor estimations in certain instances, and a resultant poor image.

SUMMARY OF THE INVENTION

The invention provides methods for global motion estimation, determining a coarse estimation, and refining a coarse estimation. Embodiments of the invention provide a fast and robust global motion estimation algorithm based on two-stage coarse-to-fine refinement strategy, which is capable of measuring large motions. An embodiment of the invention may be applied as a modification of any standard, e.g. MPEG-4 that uses the affine model of motion estimation. Embodiments of the invention may be used in the six parameter affine motion model, and other embodiments of the invention are applicable to the two parameter translation model, the four parameter RST model, and the eight parameter projective model. In a preferred embodiment, a coarse estimation is developed in a translation invariant domain, and then is refined in the spatial domain.

DESCRIPTION OF THE PREFERRED EMBODIMENTS

Figure 1:
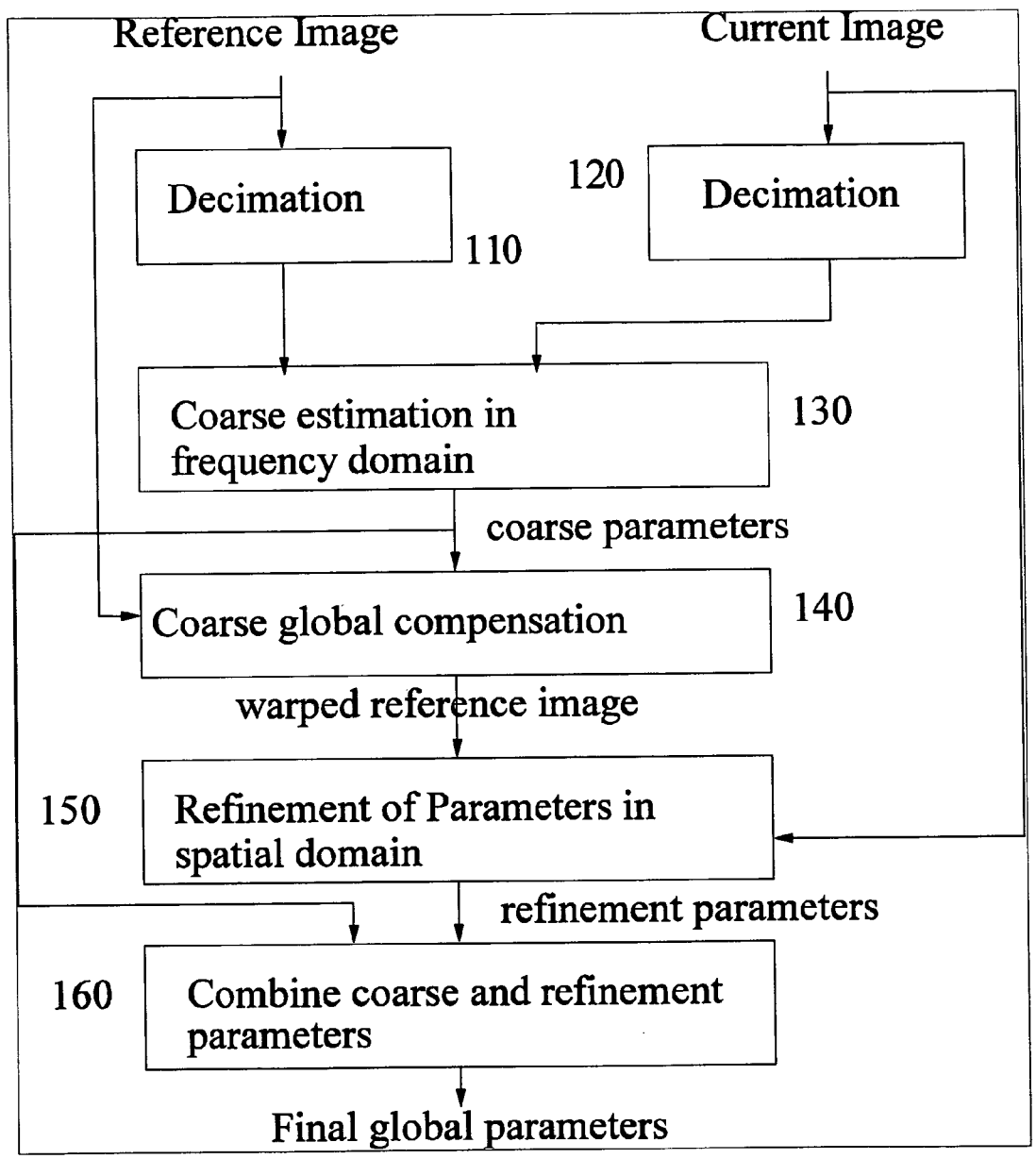
FIG. 1 shows the flow diagram for a method and system of the invention for performing global motion estimation in accordance with an embodiment of the invention.

The invention is directed to methods, devices and systems for encoding and/or processing image, e.g. video, data. Embodiments of the invention provide a fast and robust global motion estimation algorithm based on two-stage coarse-to-fine refinement strategy, which is capable of measuring large motions. Image, as used herein, refers either to an entire image or a portion of an image, such as a block or sub-block, or a selected portion of an image. Image, as used herein, could also be used to describe the entire image or its decimated version or processed version. The term "image" encompasses both entire images and any image portions, and should be so interpreted in reading the specification and the claims. A reference image and current image are related by the relationship X'=AX+B, where X' is two-dimensional coordinate of a pixel in current image and is related to that in the reference image, X by a matrix A multiplication plus a translational vector B.

In embodiments of the invention, the six-parameter affine motion model is used, and in a coarse estimation the A matrix is calculated independently in a translation invariant domain. After this, coarse estimate of B vector is calculated. Subsequent refinement calculates more accurate values of the A matrix and the B vector by model fitting, and in preferred embodiments the model fitting is conducted with respect to selected high-activity (e.g., significant spatial intensity gradient) blocks in the image. The refinement procedure can also be used in other models such as the two parameter translation model, the four parameter RST model and the eight parameter projective model. In preferred embodiments, the motion vector is measured using phase correlation to permit sub-pixel accuracy without large computational overhead.

In a preferred embodiment of the invention, a coarse estimation of the A matrix parameters is made in the frequency domain. Sampling may first be conducted, and may be adaptively selected on previous motion patterns, if such patterns are available. With patterns available, a method of the invention begins with formation of an a-priori estimate of motion, which guides the coarse estimation in the frequency domain. Once the A matrix parameters are estimated, compensation for estimated A matrix and coarse estimation of B vector follows. Subsequent refinement is conducted with sparse translation estimates in the spatial domain.

In a preferred embodiment, coarse estimation is conducted in the frequency domain using, one of polar, log-polar or log-log sampling of the Fourier magnitude spectrum of a sub-sampled image (or an original image). The type of sampling may be selectively chosen based upon past motion patterns. Down-sampling the image before coarse estimation is preferred as it helps keep the size of a Fast Fourier Transform (FFT) used to calculate the Fourier magnitude spectrum reasonably small. Use of the Fourier magnitude spectrum permits independent determination of A matrix from B vector. The sampling is preferably adaptively selected based on a past motion pattern, if available. In the absence of a past motion pattern log-polar is selected as the default in the preferred embodiment. With a past pattern of large but relatively homogeneous scaling and rotation, log-polar is selected. With a past pattern of small rotation but large and possibly inhomogeneous scaling, log-log is selected. For small scaling but large rotation simple polar sampling is used. Adaptive selection of sampling scheme insures the best trade-off between accuracy and maximum range of motion measurements for current motion pattern. With a coarse estimate in the frequency domain, there is then a refinement conducted with sparse translation determinations in the spatial domain. In the preferred embodiment, a Random Sample Consensus (RANSAC) algorithm based model fitting to motion vectors of randomly selected high-translation blocks is used. This makes the method robust to outliers. Robustness to outliers can also be achieved by several variants of RANSAC. The motion vector of blocks is measured using phase correlation, which provides sub-pixel accuracy without significant computational overhead. Additionally, with phase correlation if a particular block consists of background as well as foreground pixels, both motions are simultaneously measured. Other methods of motion determination in the spatial domain may be used, such as block matching that rely on SAD or SSD error metrics but these techniques are less desirable because they can fail in situations where phase correlation will not.

An embodiment of the invention may be applied as a modification of any standard, e.g. MPEG-4 that uses the affine model of motion estimation. Embodiments of the invention may be used in the six parameter affine motion model, and other embodiments of the invention are applicable to the two parameter translation model, the four parameter RST model and the eight parameter projective model. By the invention, known standards are improved, while embodiments of the invention make use of the general standard frameworks and known hardware implementations. Selected preferred embodiments will now be discussed with reference to the drawings, while artisans will appreciate the invention in its broader aspects as well. Embodiments of the invention include methods, and software, firmware, hardware, systems, and computer media performing such methods.

FIG. 1 shows the high level flow for a preferred method and system of the invention for performing global motion estimation. A reference image and current image are first down-sampled, e.g., by decimation 110 and 120. The down-sampling is conducted along the horizontal as well as the vertical dimension of the reference and current images, and low pass filtering is applied during the down-sampling. A coarse frequency domain estimation 130 of the global motion parameters is computed from the down-sampled reference and current images. Coarse compensation 140 of the global parameters is then conducted. The resultant warped reference image has its parameters refined in the spatial domain 150. Final affine parameters, including the A matrix and B vector are determined by intelligently combining 160 the coarse and refined parameters.

The Affine motion model is mathematically expressed as, $$X' = A * X + B \qquad (1)$$

where $$X = [x, y]^T, X' = [x', y']^T, B = [b_x, b_y]^T \text{ and}$$

$$A = \begin{bmatrix} a_{11} & a_{12} \\ a_{21} & a_{23} \end{bmatrix}$$

The superscript (T) in the above equation denotes transpose operation in matrix and vector notation. In the FIG. 1 embodiment, a reformulation of matrix A occurs, as will now be described. Without any loss of generality, let $$A = \begin{bmatrix} s_x \cos\theta_x & s_x \sin\theta_x \\ -s_y \sin\theta_y & s_y \cos\theta_y \end{bmatrix} \qquad (2)$$

where $s_x$ and $s_y$ can be interpreted as non-uniform scaling and $\theta_x$ and $\theta_y$ can be interpreted as non-uniform rotation. We define, $$s_m = \sqrt{s_x s_y} \qquad (3)$$

$$ds = \sqrt{\frac{s_x}{s_y}}$$

and $$\theta_m = \frac{1}{2}(\theta_x + \theta_y) \qquad (4)$$

$$d\theta = \frac{1}{2}(\theta_x - \theta_y)$$

We will refer to the above-defined parameters as:
$s_m$=mean scaling
ds=differential scaling
$\theta_m$=mean rotation
dθ=differential rotation Using equations (3) and (4), equation (2) takes following form, $$A = \begin{bmatrix} s_m ds(\cos(\theta_m + d\theta)) & s_m ds(\sin(\theta_m + d\theta)) \\ -\frac{s_m}{ds}\sin(\theta_m - d\theta) & \frac{s_m}{ds}\cos(\theta_m - d\theta) \end{bmatrix} \qquad (5)$$

Figure 2:
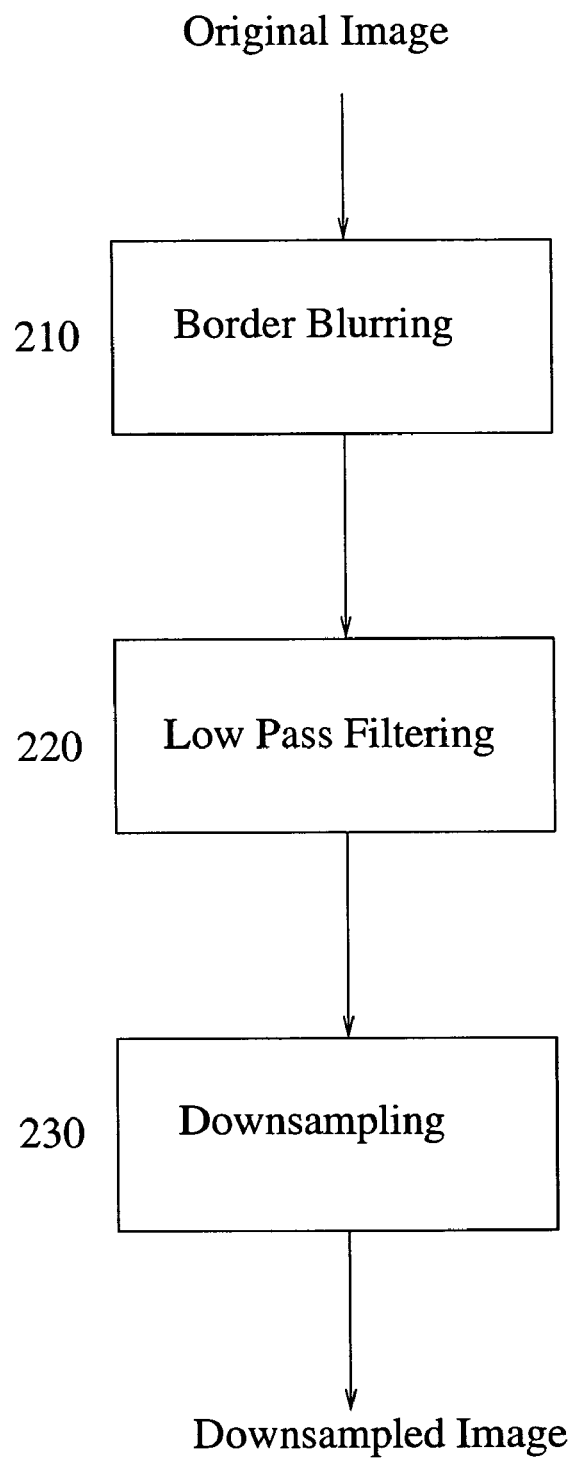
FIG. 2 shows the flow diagram for a preferred method and system for conducting the decimation used as a down-sampling step in FIG. 1.

FIG. 2 illustrates the flow for a preferred method and system for conducting the decimation used as a down-sampling step in FIG. 1. The original image (reference or current image as used in decimation steps 110 and 120), first undergoes border blurring 210. The border blurring is conducted to reduce '+' shaped artifacts due to discontinuity at image borders in the periodic extension of images inherent in Fourier transform (FFT). Low pass filtering 220 then reduces aliasing caused by down-sampling. Down-sampling 230 is then conducted along the horizontal as well as the vertical dimension of the original image with the low-pass filtering applied to reduce the complexity of coarse estimation.

Figure 3:
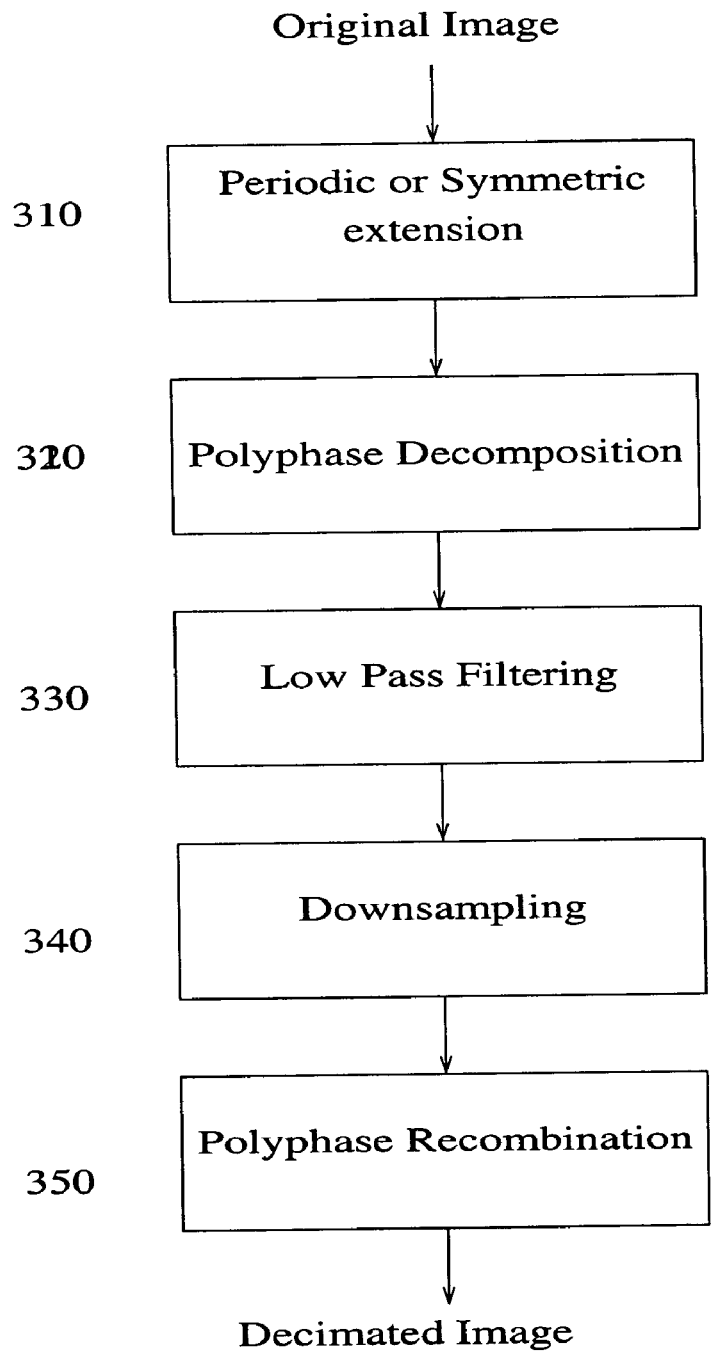
FIG. 3 shows the flow diagram for another preferred method and system for conducting the decimation used as a down-sampling step in FIG. 1.

FIG. 3 illustrates the flow for another preferred method and system for conducting the decimation used as a down-sampling step in FIG. 1. The original image (reference or current image as used in decimation steps 110 and 120), first undergoes a periodic or symmetric extension 310 to ameliorate the border discontinuity problems of FFT. Conceptually, the image is extrapolated to make it larger by copying the pixel intensity values from inside the image border to outside. In other embodiments, the extension 310 is not necessary. In an example embodiment, the values are read from inside the image border and treated as if they are read from outside the border. Polyphase decomposition 320 achieves efficient down-sampling. Low pass filtering 330 is conducted to reduce aliasing during down-sampling 340, which is conducted along the horizontal as well as the vertical dimension of the original image with the low-pass filtering applied, and the decimated image is obtained after polyphase recombination 350.

Figure 4:
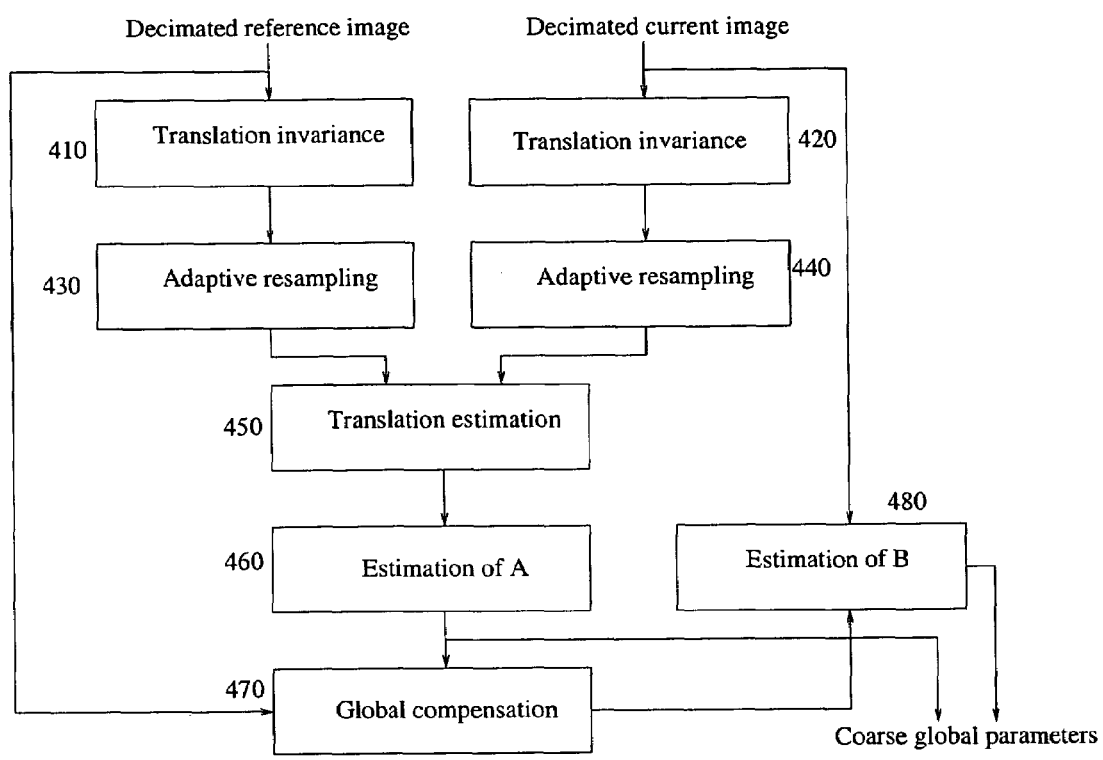
FIG. 4 shows the flow diagram for a preferred embodiment method and system for the coarse estimation conducted in FIG. 1.

FIG. 4 shows a preferred flow for the coarse estimation step 130 of FIG. 1. A translation invariant representation of the reference and current images is computed 410, 420, while preserving the effect of non-translational motions. The translation invariance in the preferred embodiment is established by computing the Fast Fourier Transform (FFT) of the original image and then computing absolute value of the Fourier coefficients. Since Fourier coefficients tend to have very high dynamic range, it is compressed logarithmically.

Any translation invariance transform can be used here instead of absolute value of FFT, as long as it preserves the effect of non-translation motions. The translation invariant representations are adaptively re-sampled 430, 440 so that non-translational motions manifest themselves as nearly uniform translational motion. Step 460 converts measurements performed in frequency domain to their spatial domain equivalent. The apparent translation is used to estimate the non-translational component of the global motion, namely, the A matrix parameters. The estimate of the A matrix parameters is used to compensate 470 the effect of the non-translational component of the motion in the spatial domain. Thus, the A matrix parameter is calculated independently, and the remaining translational component (B vector) is estimated 480 from the compensated non-translational component and the decimated current image. Step 480 works in frequency domain but its output is ready to be used in subsequent spatial domain operations and doesn't need conversion.

Figure 5:
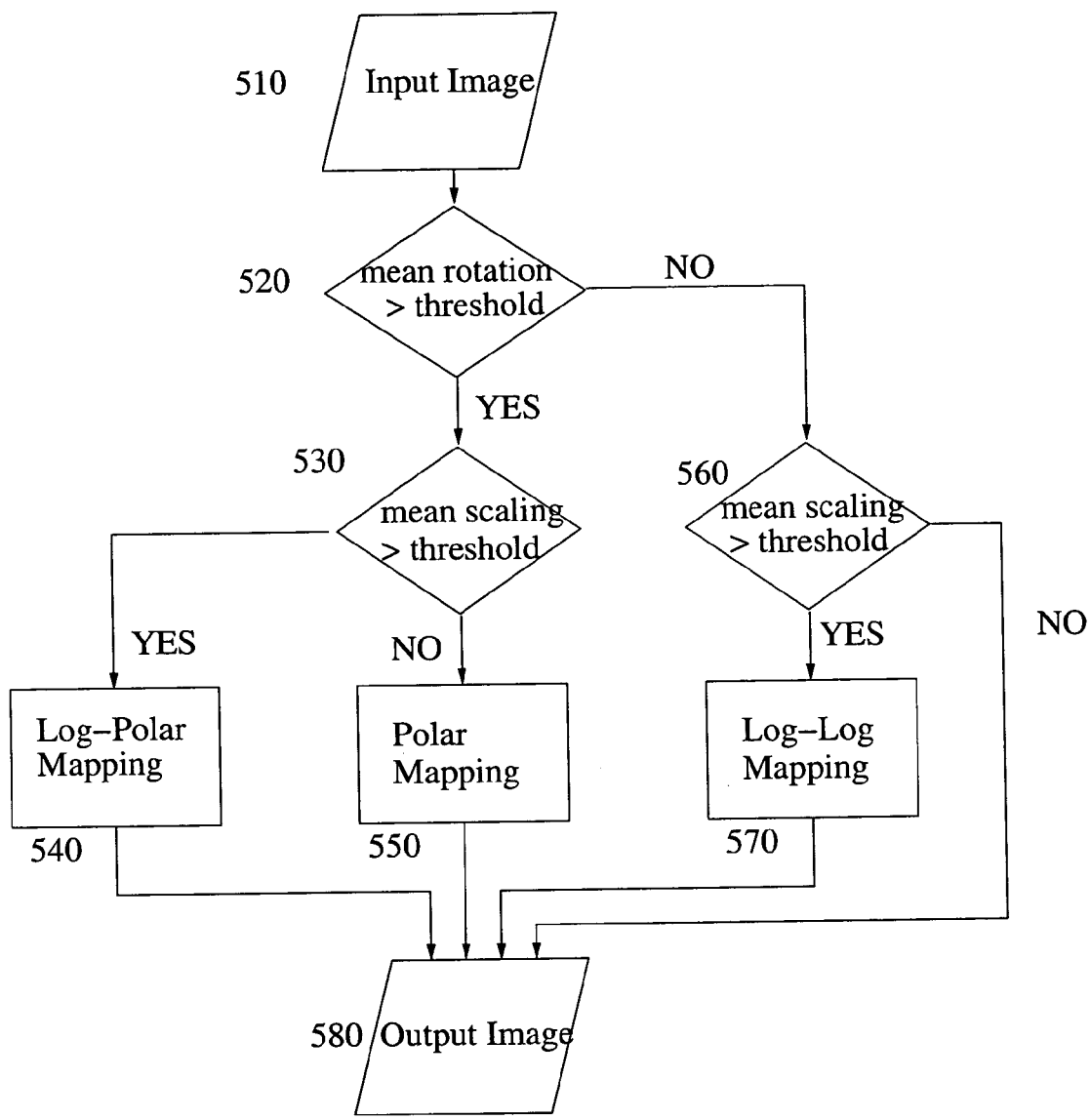
FIG. 5 shows the flow diagram for a preferred embodiment method and system for the adaptive re-sampling conducted in FIG. 4.

FIG. 5 shows the flow for the adaptive re-sampling 430, 440 conducted in FIG. 4. For small mean scaling and mean rotation, no remapping is applied to save computations. For small mean scaling, but possibly large rotation simple polar mapping is used. For small mean rotation, but large and possibly inhomogeneous scaling log-log mapping is used. For large rotation and scaling log-polar mapping is used. All the decisions are based on past motion parameters. If past motion parameters are not available e.g. due to scene change, log-polar mapping is used as default. This is effected in the flow of FIG. 5 when the input image (translation invariant version of the reference or current image) 510 is compared against a rotation threshold 520. When greater than the threshold, a scaling threshold is compared 530. If the scaling threshold is exceeded, then log-polar mapping 540 is conducted. If the scaling threshold is not exceeded, then polar mapping 550 is conducted. When the rotation threshold is not exceeded, the scaling threshold is compared 560. If it is exceeded, then log-log mapping 570 is conducted. If it is not exceeded, the output image 580 is the same as the input image, otherwise it is the result of one of the mappings, 540, 550, 570.

In the preferred embodiment, the mappings applied in 540, 550 and 570 are as follows.

$$\text{Log-Log mapping} \quad \begin{aligned} u &= \text{sign}(x)\log_c(\text{abs}(x)) \\ v &= \text{sign}(y)\log_c(\text{abs}(y)) \end{aligned} \quad (6)$$

$$\text{Log-Polar mapping} \quad \begin{aligned} r &= \log_c\left(\sqrt{x^2 + y^2}\right) \\ \theta &= \tan^{-1}\left(\frac{y}{x}\right) \end{aligned} \quad (7)$$

$$\text{Polar mapping} \quad \begin{aligned} r &= \left(\sqrt{x^2 + y^2}\right) \\ \theta &= \tan^{-1}\left(\frac{y}{x}\right) \end{aligned} \quad (8)$$

where, c is a suitably chosen constant, depending on size of image and desired resolution of range space. Exploiting the hermitian-symmetry of Fourier transform of real signals, $\theta$ is restricted to the range $(0,\pi)$. The translation estimation 450 of FIG. 4 processes adaptively re-sampled versions of the reference and current image to measure the translation that relates the adaptively re-sampled versions of the images. The estimate obtained by translation estimator 450 is converted to its spatial domain equivalent A matrix 460. The estimate of A obtained by 460 is used to warp the reference image to compensate for the linear (non-translational) component of affine transformation. Pixels lying on non-integral lattice points are interpolated from neighboring pixels. Current image and warped version of reference image are processed during the estimation of B 480, which is essentially a translation estimator, to obtain an estimate of translational component (B in eqn. (1)).

$$B = \begin{bmatrix} dx \\ dy \end{bmatrix} \quad (9)$$

where, dx and dy are shifts measured in step 480. In the preferred embodiment, the translation estimation 450 and estimation of B 480 use phase correlation technique for translation estimation. Additionally, the phase correlation preferably incorporates peak location interpolation.

An estimate of linear component (A in eqn. (1)) of the affine-transform is obtained by estimation 460, using the translation measured by translation estimation 450 and the re-sampling scheme adopted by adaptive re-sampling 430, 440. The estimate is obtained in the preferred embodiments as follows:

$$\text{No remapping} \quad A = \begin{bmatrix} 1 & 0 \\ 0 & 1 \end{bmatrix} \quad (10)$$

$$\text{Log-Log mapping} \quad A = \begin{bmatrix} c^{-du} & 0 \\ 0 & c^{-dv} \end{bmatrix} \quad (11)$$

where, du and dv are shifts along u and v axes.

$$\text{Log-polar mapping} \quad A = c^{-dr}\begin{bmatrix} \cos d\theta & \sin d\theta \\ -\sin d\theta & \cos d\theta \end{bmatrix} \quad (12)$$

where, dr and d$\theta$ are shifts along r and $\theta$ axes.

$$\text{Polar mapping} \quad A = \begin{bmatrix} \cos d\theta & \sin d\theta \\ -\sin d\theta & \cos d\theta \end{bmatrix} \quad (13)$$

The refinement 150 may then be based on following rearrangement of eqn. (1)

$$dX = X' - X = (A - I_2)X + B \quad (14)$$

This step may be skipped if no re-sampling was applied, i.e., when the mean scaling threshold check 560 results in the output image being the same as the input image and only translational motion model is used or a coarse estimate of parameters is sufficient for the application.

Figure 6:
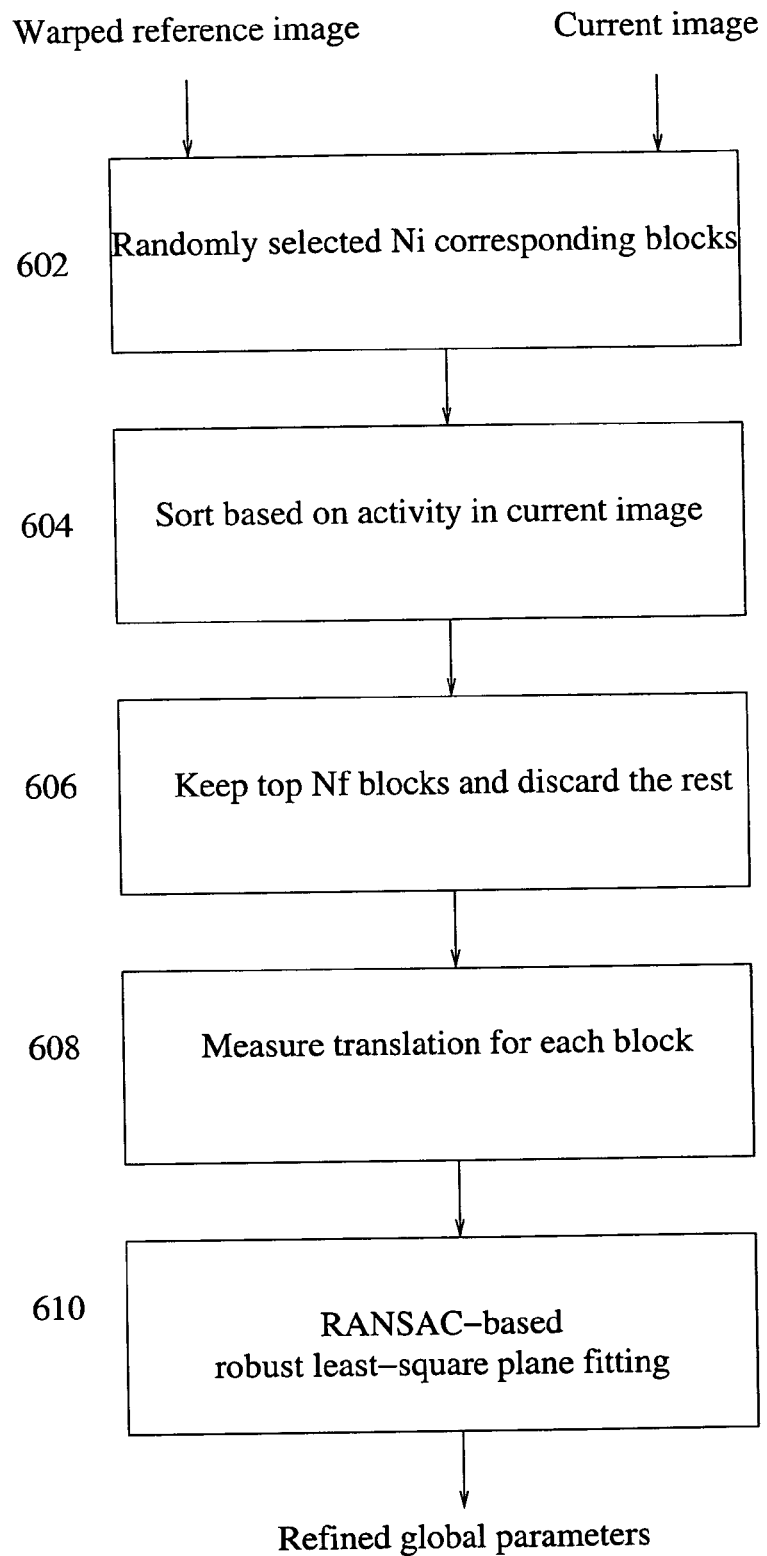
FIG. 6 shows the flow diagram for a preferred embodiment method and system for the refinement in the spatial domain conducted in FIG. 1.

FIG. 6 shows the flow for the refinement 150 of FIG. 1. The refinement begins with the warped reference image and the current image. A number $N_i$ of corresponding blocks from the reference and warped image are selected 602. Specifically, a set of $N_i$ random blocks is selected from current image that also have a corresponding block in the warped reference image. This strategy tends to alleviate the problem of some new image regions appearing in the image frame and some old image regions disappearing from the image frame. The distribution of probability of selecting a block from a region in image can be non-uniform, if some a-priori segmentation information is available, so as to avoid selecting blocks from image regions which do not follow the global motion pattern. In practice, it is not necessary to pre-warp the reference image before starting the refinement stage, and it is sufficient to warp only those parts of the reference image which are selected to participate in the refinement.

These blocks are sorted based upon the level of activity 604. In general, activity can be measured as sum of absolute difference from mean, variance, or eigen values of windowed image second moment matrix. These three metrics have been arranged in increasing order of computational complexity but also in increasing order of reliability. Variance provides a good trade-off, while sum of absolute difference can be beneficial for low-power applications. Another possibility is to look for a significant bi-direction intensity gradient inside a block. The sorting 604 is intended to distinguish between promising and non-promising blocks for further motion estimation, since low activity blocks are likely to give wrong motion vectors due to aperture effect. The top $N_f$ blocks from the sorted list are promising blocks kept under consideration and the remaining blocks are discarded. Thus, an adaptive threshold on the activity is implicitly applied.

The translation between each of the high activity $N_f$ promising blocks in the current frame and its counterpart in the compensated reference frame is computed 608. This translation estimation is done using phase-correlation as it provides two advantages as compared to other methods, in this regard. First, it measures sub-pixel-accurate translation with reasonably small amount of computations. Second, the translation measurement result is almost independent of minority outlier pixels, which may be due to foreground pixels. When neither background nor foreground is dominant, it gives two motion vectors, one corresponding to each.

Figure 7:
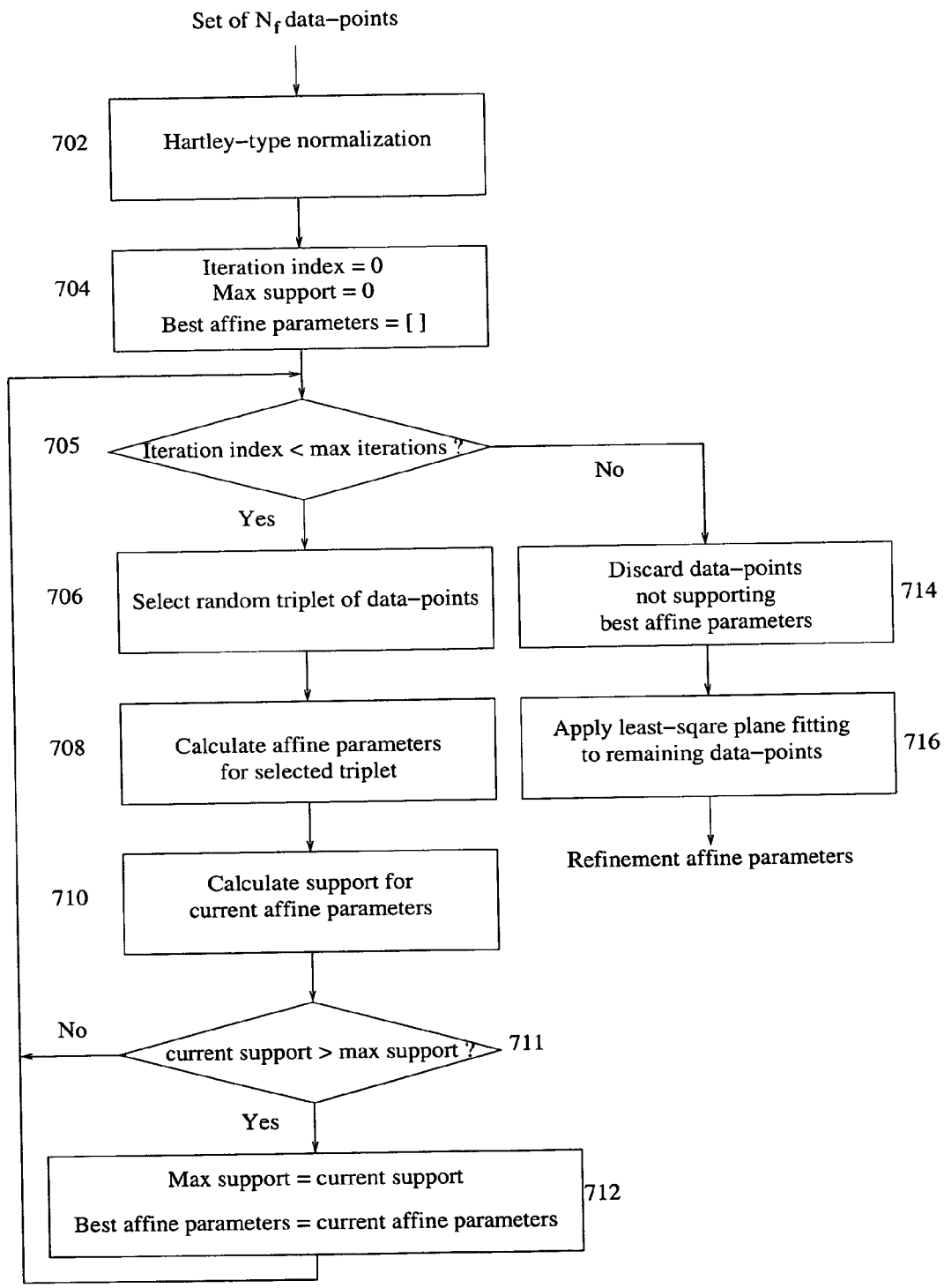
FIG. 7 shows the flow diagram for a preferred embodiment method and system for the model fitting of FIGS. 1 and 6.

The data through step 608 is passed to a RANSAC-based robust least-square model fitting 610 as a set of $N_f$ pentuples (x,y,1,dx,dy), henceforth referred to as data-points, where
x=x coordinate of center of block
y=y coordinate of center of block
dx=translation of block along x-axis
dy=translation of block along y-axis A preferred embodiment model fitting for step 610 for the six parameter affine model is illustrated in FIG. 7. Modifications for other models will be discussed later. The data passed to the model fitting may be considered numerically ill conditioned, so data normalization 702 is conducted. Normalization, e.g., a Hartley normalization, a modified Hartley normalization, or another computationally acceptable normalization, is conducted 702 on the data points in the $N_f$ blocks. A computationally simpler normalization scheme is preferred over Hartley normalization. Because the center of image was used as the origin of the coordinate system and blocks were randomly selected, the data is already fairly centered. Making the assumption of centered data permits normalization by a simple scaling. In present context, the scaling for normalization is equivalent to replacing data-point (x, y, 1, dx, dy) by (x, y, k, dx, dy), where k is an appropriate constant. Choosing k as a power of 2, gives some computational benefits by simplifying some multiplications and divisions.

Iterations and max support are set to zero and the best affine parameters are set to an empty set in 704. The iteration index is checked to ensure that a maximum number of iterations has not been met 705. If it has not been met, a random triplet of data points is selected 706. Three data-points are selected, since 3 point-correspondences completely define the affine-transformation, unless three points are collinear. While in the loop, every time we choose 3 data-points in step 706, they uniquely determine a set of affine parameters but these parameter values may not be consistent with other data-points (apart from the chosen 3, since those 3 will trivially be consistent). If a data-point is consistent with a particular value of affine parameters it is said to be in the support set of the affine parameter. "Best affine parameter" refers to the that value of affine parameter encountered so far which had the largest support set, and the size of the support set of the best affine parameter is called "max support". The affine parameters are calculated for the selected triplet 708. Block 708 calculates affine parameters from the three selected data-points using following relationship.

$$\left[(A - I_2) \mid \frac{B}{k}\right] = \left[\frac{dx_1}{dy_1} \mid \frac{dx_2}{dy_2} \mid \frac{dx_3}{dy_3}\right] \left[\begin{array}{c|c|c} x_1 & x_2 & x_3 \\ y_1 & y_2 & y_3 \\ k & k & k \end{array}\right]^{-1} \quad (15)$$

where, $I_2$ is 2×2 identity matrix.

Support is calculated for the current affine parameters 710. The number of supporting data-points, which exhibit a motion vector consistent with currently determined affine parameters, is computed (step 710) by counting the number of data-points for which the norm (e.g. $L_1$ or $L_2$) of the following error metric is below a suitable threshold.

$$e = \left[\frac{dx}{dy}\right] - \left[(A - I_2) \mid \frac{B}{k}\right] \left[\begin{array}{c} x \\ y \\ k \end{array}\right] \quad (16)$$

If the current support does not exceed the maximum support from previous iterations, then the iteration index is checked 705 without resetting the support and the affine parameters 711. If the current support does exceed the maximum support from previous iterations, then the max support and best affine parameters are set as the current support and the current affine parameters 712. The largest set of supporting data-points (computed by steps 711 and 712) is categorized as inlier and the rest are declared outliers. When the maximum number of iterations is reached, then data points not supporting the best affine parameters are discarded 714. The simple least square plane fitting is applied to the remaining data points (inlier data points) 716 to determine the refined affine parameters. In other embodiments, line or curve fitting is used. During the plane fitting 716, corresponding local translation motion vectors for the set of $N_f$ promising blocks is determined. A pair of planes is fitted to the location of each of the promising blocks the corresponding local translation motion vectors. During the refinement process, it is possible to minimize foreground objects effects and featureless region effects by incorporating the reliability measures and robustness to outliers discussed above, to discard the outliers and exclude the outliers from the fitting in the plane fitting step 716.

Refinement stage 150 can also be used for the case of 2-parameter translational model, 4-parameter RST motion model and 8-parameter projective motion model. Following relationships assume that normalization wasn't performed at step 702, but these can be modified to accommodate the case when normalization is performed. The following discussion uses the refinement procedure described in FIG. 6 and FIG. 7 with the following modifications for the two parameter translation model, the four parameter RST model and the eight parameter projective model.

For 2-parameter translational model, Equation (1) takes following form.

$$x'=x+t_x$$

$$y'=y+t_y$$

where, $t_x$, $t_y$ are the two translation parameters.

Since, one data-point is enough to uniquely determine two translation parameters, in step 706 we choose 1 instead of 3 data-points, Equation (15) takes following form.

$$t_x=dx$$

$$t_y=dy$$

Error metric of Equation (16) is modified as, $$e = \begin{bmatrix} dx \\ dy \end{bmatrix} - \begin{bmatrix} t_x \\ t_y \end{bmatrix}$$

For 4-parameter RST motion model Equation (1) takes following form.

$$x'=s(\cos\theta)x+s(\sin\theta)y+t_x$$

$$y'=-s(\sin\theta)x+s(\cos\theta)y+t_y$$

where, s, $\theta$, $t_x$, $t_y$ are the four parameters.

Since, two data-points are enough to uniquely determine four RST parameters, in step 706 we choose 2 instead of 3 data-points. Equation (15) takes following form.

$$\begin{bmatrix} t_x \\ t_y \\ a \\ b \end{bmatrix} = \begin{bmatrix} 1 & 0 & x_1 & y_1 \\ 0 & 1 & y_1 & -x_1 \\ 1 & 0 & x_2 & y_2 \\ 0 & 1 & y_2 & -x_2 \end{bmatrix}^{-1} \begin{bmatrix} dx_1 \\ dy_1 \\ dx_2 \\ dy_2 \end{bmatrix}$$

where, the relationship between (a,b) and (s,$\theta$) is given as follows.

$$s = \sqrt{(1-a)^2 + b^2}$$

$$\theta = \arctan\left(\frac{b}{1+a}\right)$$

Error metric of Equation (16) is modified as $$e = \begin{bmatrix} dx \\ dy \end{bmatrix} - \begin{bmatrix} a & b & t_x \\ b & -a & t_y \\ 0 & 0 & 1 \end{bmatrix} \begin{bmatrix} x \\ y \\ 1 \end{bmatrix}$$

For 8-parameter projective motion model, Equation (1) takes following form.

$$x' = \frac{ax+by+c}{gx+hy+1}$$

$$y' = \frac{dx+ey+f}{gx+hy+1}$$

where, a, b, c, d, e, f, g and h are the eight parameters.

Since, four data-points are enough to uniquely determine eight projective parameters, in step 706 we choose 4 instead of 3 data-points. Equation (15) takes following form.

$$\begin{bmatrix} a' \\ b' \\ c' \\ d' \\ e' \\ f' \\ g' \\ h' \end{bmatrix} = - \begin{bmatrix} x_1 & y_1 & 1 & 0 & 0 & 0 & x_1 dx_1 & y_1 dx_1 \\ 0 & 0 & 0 & x_1 & y_1 & 1 & x_1 dy_1 & y_2 dy_1 \\ x_2 & y_2 & 1 & 0 & 0 & 0 & x_2 dx_2 & y_2 dx_2 \\ 0 & 0 & 0 & x_2 & y_2 & 1 & x_2 dy_2 & y_2 dy_2 \\ x_3 & y_3 & 1 & 0 & 0 & 0 & x_3 dx_3 & y_3 dx_3 \\ 0 & 0 & 0 & x_3 & y_3 & 1 & x_3 dy_3 & y_3 dy_3 \\ x_4 & y_4 & 1 & 0 & 0 & 0 & x_4 dx_4 & y_4 dx_4 \\ 0 & 0 & 0 & x_4 & y_4 & 1 & x_4 dy_4 & y_4 dy_4 \end{bmatrix}^{-1} \begin{bmatrix} dx_1 \\ dy_1 \\ dx_2 \\ dy_2 \\ dx_3 \\ dy_3 \\ dx_4 \\ dy_4 \end{bmatrix}$$

where, primed parameters are related to original parameters as follows.

$$\begin{bmatrix} a \\ b \\ c \\ d \\ e \\ f \\ g \\ h \end{bmatrix} = \begin{bmatrix} a'+g' \\ b'+h' \\ c'+1 \\ d'+g' \\ e'+h' \\ f'+1 \\ g' \\ h' \end{bmatrix}$$

Error metric of Equation (16) is modified as, $$e = \begin{bmatrix} dx \\ dy \end{bmatrix} - \begin{bmatrix} \frac{a'x+b'y+c'}{g'x+h'y+1} \\ \frac{d'x+e'y+f'}{g'x+h'y+1} \end{bmatrix}$$

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for estimating global motion between a reference image or a portion thereof and a current image or a portion thereof, the method comprising steps of:
computing translation invariant representations of the reference image or the portion thereof and the current image or the portion thereof, wherein the translation invariant representations preserve non-translational motion effects present in the reference image or the portion thereof and the current image or the portion thereof;

from the translational invariant representations, determining a coarse estimation of the effect of the non-translational motion between the reference and the current image or the portions thereof; and determining a coarse estimation of the effect of translational motion from the coarse estimation of the effect of the non-translation motion and the current image or the portion thereof, wherein the effect of the non-translation motion and the effect of the translation motion together constitute a coarse estimate of the global motion, wherein said step of determining a coarse estimation includes a step of adaptively re-sampling the translation invariant representations of the reference image or the portion thereof and the current image or the portion thereof; wherein said step of adaptively re-sampling comprises re-sampling an original image that is one of the reference image or the portion thereof or the current image or the portion thereof:

conducting no re-mapping where past motion parameters indicate small mean scaling and small mean rotation for the original image or the portion thereof;

conducting polar mapping where past motion parameters indicate small mean scaling and possibly large mean rotation for the original image or the portion thereof;

conducting log-log mapping where past motion parameters indicate small mean rotation and possibly large mean scaling for the original image or the portion thereof; and otherwise conducting log-polar mapping.

2. A method for estimating global motion between a reference image or a portion thereof and a current image or a portion thereof, wherein the relationship between the reference image or the portion thereof and the current image or the portion thereof are defined by the relationship X'=AX+B, where X' is coordinate of a pixel in the current image or the portion thereof and is related to coordinate of corresponding pixel in the reference image or the portion thereof X by a matrix $$A = \begin{bmatrix} s_x \cos\theta_x & s_x \sin\theta_x \\ -s_y \sin\theta_y & s_y \cos\theta_y \end{bmatrix}$$

multiplication plus a translational vector B, the method comprising steps of:

in the frequency domain, determining a coarse estimate of the matrix according to $$A = \begin{bmatrix} s_m ds(\cos(\theta_m + d\theta)) & s_m ds(\sin(\theta_m + d\theta)) \\ -\frac{s_m}{ds}\sin(\theta_m - d\theta) & \frac{s_m}{ds}\cos(\theta_m - d\theta) \end{bmatrix},$$

, wherein $S_m$=mean scaling
ds=differential scaling
$\theta_m$=mean rotation
$d\theta$=differential rotation;

determining a coarse estimate of the vector B, by applying the coarse estimate of the matrix A to the reference image or the portion thereof and comparing to the current image or the portion thereof;

combining the coarse estimate of the matrix A and the coarse estimate of the vector B as coarse global parameters;

in the spatial domain, refining the coarse global parameters wherein said step of refining comprises:

applying the coarse estimate to the reference image or the portion thereof to produce a warped reference image;

selecting $N_i$ corresponding blocks from the current image or the portion thereof and warped reference image;

selecting $N_f$ blocks exhibiting the $N_f$ highest levels of activity wherein $N_f$ is less than $N_i$ and other ones of the $N_i$ blocks are discarded; and determining the translation between each of the high activity $N_f$ promising blocks in the current image or the portion thereof and its corresponding block in the warped reference image;

wherein said step of determining a coarse estimate includes a step of adaptively re-sampling translation invariant representations of the reference image or the portion thereof and the current image or the portion thereof; wherein said step of adaptively re-sampling comprises re-sampling an original image that is one of the reference image or the portion thereof or the current image or the portion thereof:

conducting no re-mapping where past motion parameters indicate small mean scaling and small mean rotation for the original image or the portion thereof;

conducting polar mapping where past motion parameters indicate small mean scaling and possibly large mean rotation for the original image or the portion thereof;

conducting log-log mapping where past motion parameters indicate small mean rotation and possibly large mean scaling for the original image or the portion thereof; and otherwise conducting log-polar mapping.

3. The method of claim 2, further comprising a step of sorting the $N_i$ corresponding blocks based upon a level of activity.

4. The method of claim 2, wherein said step of determining the translation comprises phase-correlation.

5. The method of claim 2, wherein the level of activity is measured by one of the group consisting of sum of absolute difference from mean, variance or eigen values of windowed image second moment matrix.

6. A method of refining a coarse estimation of global motion between a reference image or a portion thereof and a current image or a portion thereof, the coarse estimation including an estimate of the effect of non-translation motion and an estimate of the effect of translational motion, the method comprising steps of:

selecting a plurality of promising blocks from corresponding parts of a warped version reference image or the portion thereof and from the current image or the portion thereof, wherein the promising blocks comprise blocks of high activity;

determining corresponding local translation motion vectors for the plurality of promising blocks selected in said step of selecting;

classifying data points in the plurality of promising blocks as inlier data points or outlier data points;

using only inlier data points, fitting one of a set of lines, curves or planes to the location of each of the plurality of promising blocks selected in said step of selecting and the corresponding local translation motion vectors determined in said step of determining;

wherein the coarse estimation is determined at least by adaptively re-sampling translation invariant representations of the reference image or the portion thereof and the current image or the portion thereof; wherein said step of adaptively re-sampling comprises re-sampling an original image that is one of the reference image or the portion thereof or the current image or the portion thereof:

conducting no re-mapping where past motion parameters indicate small mean scaling and small mean rotation for the original image or the portion thereof;

conducting polar mapping where past motion parameters indicate small mean scaling and possibly large mean rotation for the original image or the portion thereof;

conducting log-log mapping where past motion parameters indicate small mean rotation and possibly large mean scaling for the original image or the portion thereof; and otherwise conducting log-polar mapping.

7. The method of claim 6, wherein said step of refining comprises random sampling based model fining.

8. A method for refining a coarse estimate of global motion between a reference image or a portion thereof and a current image or a portion thereof, wherein the relationship between the reference image or the portion thereof and the current image or the portion thereof is defined by the relationship X'=AX+B, where X' is coordinate of a pixel in the current image or the portion thereof and is related to coordinate of corresponding pixel in the reference image or the portion thereof; X by a matrix A multiplication plus a translational vector B, and the coarse estimate provides a coarse estimate of the matrix A and the translational vector B, the method comprising steps of:

applying the coarse estimate to the reference image or the portion thereof to produce a warped reference image; wherein the coarse estimate is determined at least by adaptively re-sampling translation invariant representations of the reference image or the portion thereof and the current image or the portion thereof; wherein said step of adaptively re-sampling comprises re-sampling an original image that is one of the reference image or the portion thereof or the current image or the portion thereof:

conducting no re-mapping where past motion parameters indicate small mean scaling and small mean rotation for the original image or the portion thereof;

conducting polar mapping where past motion parameters indicate small mean scaling and possibly large mean rotation for the original image or the portion thereof;

conducting log-log mapping where past motion parameters indicate small mean rotation and possibly large mean scaling for the original image or the portion thereof; and otherwise conducting log-polar mapping;

selecting $N_i$ corresponding blocks from the current image or the portion thereof and warped reference image;

selecting $N_f$ blocks exhibiting the $N_f$ highest levels of activity, wherein $N_f$ is less than $N_i$ and other ones of the $N_i$ blocks are discarded; and determining the translation between each of the high activity $N_f$ promising blocks in the current image or the portion thereof and its corresponding block in the reference image or the portion thereof.

9. The method of claim 8, further comprising a step of sorting the $N_i$ corresponding blocks based upon a level of activity.

10. The method of claim 8, wherein said step of refining comprises model fining.

11. A method for refining a coarse estimate of global motion between a reference image of a portion thereof and a current image or a portion thereof wherein the relationship between the reference image or the portion thereof and the current image of the portion thereof is described by the two parameter translational model, the four parameter RST model or the eight parameter projective model, the method comprising steps of applying the coarse estimate to the reference image or the portion thereof to produce a warped reference image; wherein the coarse estimate is determined at least by adaptively re-sampling translation invariant representations of the reference image or the portion thereof and the current image or the portion thereof; wherein said step of adaptively re-sampling comprises re-sampling an original image that is one of the reference image or the portion thereof or the current image or the portion thereof:

conducting no re-mapping where past motion parameters indicate small mean scaling and small mean rotation for the original image or the portion thereof;

conducting polar mapping where past motion parameters indicate small mean scaling and possibly large mean rotation for the original image or the portion thereof;

conducting log-log mapping where past motion parameters indicate small mean rotation and possibly large mean scaling for the original image or the portion thereof; and otherwise conducting log-polar mapping;

selecting $N_i$ corresponding blocks from the current image or the portion thereof and warped reference image;

selecting $N_f$ promising blocks exhibiting the $N_f$ highest levels of activity, wherein $N_f$ is less than $N_i$ and other ones of the $N_i$ blocks are discarded; and determining the translation between each of the high activity $N_f$ promising blocks in the current image or the portion thereof and its corresponding block in the reference image or the portion thereof.

12. The method of claim 11, further comprising a step of sorting the $N_i$ corresponding blocks based upon level of activity.

13. The method of claim 11, further comprising model fitting.

* * * * *

UNITED STATES PATENT AND TRADEMARK OFFICE
CERTIFICATE OF CORRECTION

PATENT NO.         : 7,349,583 B2  
APPLICATION NO. : 10/931473  
DATED              : March 25, 2008  
INVENTOR(S)        : Kumar et al.

Page 1 of 1

It is certified that error appears in the above-identified patent and that said Letters Patent is hereby corrected as shown below:

Column 12, line 14, delete "$y_2 dy_1$" and insert -- $y_1 dy_1$ -- therefor.

Column 15, line 25, delete ";" after "thereof" and insert -- , -- therefor.

Signed and Sealed this

Sixteenth Day of September, 2008

JON W. DUDAS  
*Director of the United States Patent and Trademark Office*